April 25, 1939.        C. L. LOHNER        2,155,725
CARCASS TONGUE PROTECTOR
Filed March 29, 1937        2 Sheets-Sheet 1

Carl L. Lohner
INVENTOR

ATTEST-

BY
ATTORNEY

April 25, 1939.   C. L. LOHNER   2,155,725
CARCASS TONGUE PROTECTOR
Filed March 29, 1937   2 Sheets-Sheet 2
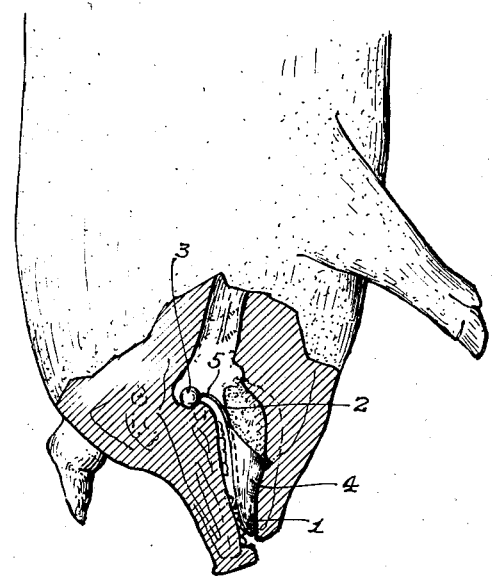
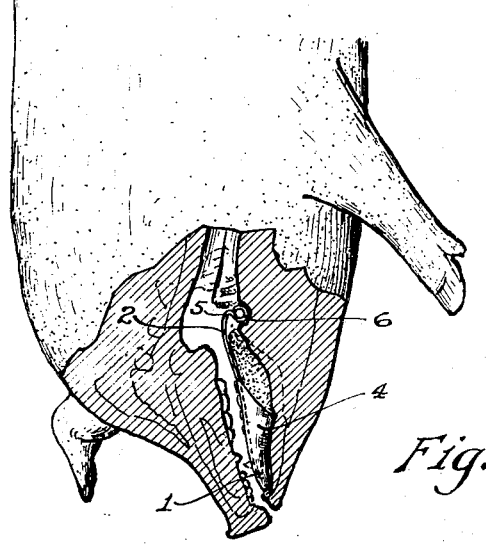
Carl L. Lohner
INVENTOR
ATTEST-
BY
ATTORNEY Patented Apr. 25, 1939

2,155,725

UNITED STATES PATENT OFFICE 2,155,725

CARCASS TONGUE PROTECTOR

Carl L. Lohner, Chicago, Ill., assignor to Industrial Patents Corporation, Chicago, Ill., a corporation of Delaware Application March 29, 1937, Serial No. 133,727

4 Claims. (Cl. 17—1)

This invention relates to means for protecting the tongue of a carcass during processing.

One of the objects of the invention is to provide means for protecting a hog tongue from the teeth and from the dehairing beaters during dehairing of the carcass.

Another object of the invention is to provide means for holding a tongue protector in the mouth of a hog carcass.

Other objects of the invention will be apparent from the description and claims which follow.

Figure 3 is a partial side view of a hog carcass, partly cut away, showing the manner of securing the device illustrated in Figure 1 in the mouth of the carcass.

Figure 4 is a partial side view of a hog carcass, partly cut away, showing the manner of securing the device illustrated in Figure 2 in the mouth of the carcass.

Figure 1:
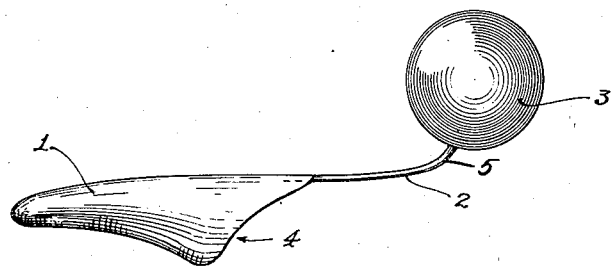
Figure 1 is a side view of one embodiment of the present invention.

Referring now more particularly to Figure 1: It will be noted that the sheath or envelope 1 is provided with rod 2 terminating in ball 3. In using the tongue protector shown in Figure 1, the tip of the tongue is covered by sheath 1, the tongue entering at 4. Rod 2 is bent at 5 whereby ball or enlargement 3 may be fitted into the fore portion of the pharynx, whereby it presses against the nasal turbinated bones of a hog's head, holding the sheath 1 in position.

Figure 2:
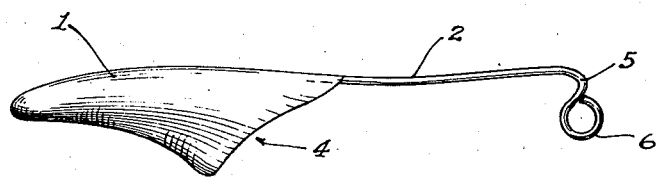
Figure 2 is a side view of another embodiment of the present invention.

Figure 2 illustrates a tongue protector employing a similar sheath 1, differing in that rod 2 is bent at 5 in a direction opposite to that shown in Figure 1 and terminates in enlargement 6 forming an unpointed hook which may be lodged in the opening of the trachea in the hog's head.

The manner of securing the several devices within the mouth of a carcass is shown in Figures 3 and 4.

It will be readily apparent that the form and size of the enlargements may be varied as desired. It will also be apparent that the means for protecting the tongue may be a metal sheath or envelope such as is shown in the drawings, or any other desired guard means.

The present invention is particularly directed to the means for holding the tongue protector in the carcass mouth against dislodgment by the action of dehairing beaters or gravity.

The means of the present invention for holding a tongue protector in a carcass mouth does not involve the use of pointed hooks or sharp projections, which might damage the tongue or the inside of the hog's mouth, and does not involve the use of resilient arms or spring members, which ordinarily require auxiliary tools for insertion, but avails of the anatomy of the hog's head by providing a holding means which may be secured in an appropriate cranial cavity.

I claim:

1. A tongue protector comprising guard means for the tongue and holding means for securing the tongue protector in a carcass mouth, said holding means being adapted to be secured in a cranial cavity.

2. In a tongue protector, holding means comprising an enlargement adapted to be secured in a cranial cavity.

3. In a tongue protector, holding means comprising a rod provided with an enlargement adapted to fit in the fore portion of the pharynx and press against the nasal turbinated bones of a hog carcass head.

4. In a tongue protector, holding means comprising a rod curved to form a hooking means adapted to be lodged in the opening of the trachea of a hog carcass head.

CARL L. LOHNER.